United States Patent [19]

Morrill

[11] 4,253,764
[45] * Mar. 3, 1981

[54] SOLAR ENERGY METERING AND RECORDING SYSTEM

[76] Inventor: Ralph A. Morrill, 2935 NW. Satinwood St., Corvallis, Oreg. 97330

[*] Notice: The portion of the term of this patent subsequent to May 22, 1996, has been disclaimed.

[21] Appl. No.: 876,935

[22] Filed: Feb. 10, 1978

[51] Int. Cl.$^3$ .......................... G01J 1/42; G01J 5/48; G01J 5/00
[52] U.S. Cl. ................................. 356/225; 356/318; 356/43
[58] Field of Search ..................... 356/218, 225, 43; 73/355

[56] References Cited

U.S. PATENT DOCUMENTS 3,880,528   4/1975   petersen ............................. 356/225

OTHER PUBLICATIONS

G. G. Lebed', L. V. Gushchina, D. A. Nazarov, "A Device for Automatically Metering Light Energy" Instrumentation and Control, No. 4, Apr. 1971, pp. 67-69.

R. M. Master, "Solar Energy Meter" NASA publication TM-73791, Sep. 1977.

Primary Examiner—John K. Corbin
Assistant Examiner—Rodney B. Bovernick

[57] ABSTRACT

A complete system for detecting and metering solar energy and recording the total integrated energy or power levels over a desired period of time. The system emphasises simplicity of design to achieve: a transducer sensitive to the presence of solar radiance which efficiently absorbs the incident direct energy over the broad solar spectrum or may be filtered to specific spectra bands and which embodies a means of generating a voltage proportional to the levels of incident solar energy; a means of selecting the minimum level of incident energy for initiating metering above a preset threshold and rejecting levels below a given ambient temperature level; a programable means of computing which directly converts the energy proportional voltage to an energy-density analogue voltage that may be programed to replicate the performance characteristics of known or typical Solar Energy Systems and whose values may be scaled to the equivalent units of thermal, electrical or mechanical energy or power measurement desired; a means of recording the sum-total of the energy or power levels measured, whose instantaneous values are integrated continuously over the desired period of time, and which may be read directly and reset for each period; and an optional means of monitoring and calibration of the system. The recorded data is measured in such values as are directly related to the potential thermal, electrical or mechanical power that would be produced by a typical solar energy system installed at the site of measurement. The metering and recording system could also be employed to monitor the actual performance of an installed solar energy system or other solar powered device.

8 Claims, 4 Drawing Figures

SOLAR ENERGY METERING AND RECORDING SYSTEM

FIELD OF INVENTION

This invention relates in general to solar pyranometers, radiometers or meteorological instruments and more specifically an uniquely to a system for the direct measurement and recording of the solar energy; which complete system is simply composed, may be self-powered and selectively programed to compute and record the resulting data directly in units of energy or power measurement that are easily related to an accurate estimate of the actual performance of typical Solar Energy Collector Systems or other solar powered devices to be installed at the site of measurement; to determine the solar system feasibility, design requirements and optimal size or configuration; or to monitor the operation of such systems or devices after installation.

BACKGROUND

Although the interest in solar energy utilization goes back to earliest history, the first commercial use of solar hot water devices did not find a practical market until early in the 20th century. In the 1950's a revival of solar technologies developed new systems for household heating, water distillation, mechanical pumping, industrial furnaces and new solar photovoltaic cells which brought several new instruments into existance for the direct measurement of solar energy radiant intensity. These instruments were mainly expensive laboratory quality devices for use by solar and biological scientists, the academic research community and meteorological and atmospheric scientists to determine the duration and intensity of solar heating of the earth's atmosphere and surface or the climatology of specific areas. Only limited measurements have so far been made in meterological, climatological, environmental, botanical and biological research studies. The intense national need and dedication within the past decade for the development of alternative energy sources to our fossil-fuel based society has seen the rapid development of economically feasible advanced solar energy systems of many kinds for thermal, electrical and mechanical power production, but little corresponding advancement has occurred in solar energy metering instruments.

A reluctance to rely upon limited data and widely extrapolated estimates of the energy potential of the sun, the failure of some research demonstrations of these systems and a habitual dependence upon a fossil fueled economy, has inhibited the effective public acceptance of this clean and virtually unlimited energy resource. Solar energy systems of many kinds are commercially ready now for widespread cost-effective use, but what is needed to convince the public of its viability and practicality are low cost reliable instruments that can be operated by persons of nominal skills to accurately measure the actual solar energy potential at specific sites of use. No known prior art instrument or systems of this kind now exist which are designed specifically as a complete system for the direct metering and recording of the thermal, electrical and mechanical power potential of the radiant energy from the sun.

In brief review of the technology relevant to this invention, the energy from the sun at the earth's orbital distance has been termed the "solar constant" which averages 1.94 calories per square centimeter per minute, or the equivalent of approximately 77 BTU's per minute or 1.37 kilowatts irradiating each square meter of the earth's hemisphere. The earth's atmosphere attenuates and spectrally filters this energy to less than approximately one-forth this level over the spectra band between 0.2 to 18 micrometers (micron) wavelength. The lower the angle of incidence of the sun's energy with respect to the local surface plane, the greater the atmospheric attenuation. The greatest single modifier of solar radiation is atmospheric moisture and cloud cover which results in diffuse scatter, reflection and direct energy attenuation by conversion to heat so that at the surface the spectral range of nearly all significant solar radiation, about 60 percent, is the shorter wavelength energy in approximately the 0.2 to 3.0 micron range, most of which is directly received on a clear day entirely in the $\frac{1}{2}$ degree aperature angle of the sun as observed from the earth, plus approximately 1 degree angle for refraction due to atmospheric turbulence. On cloudy days up to 40 percent of the total available solar energy may be received from diffuse radiation alone within an angle of 30 degrees about the sun location.

Solar Energy Collector Systems may be of many different types but all share a common configuration of having some form of energy absorbing surface or focus the energy on an absorber, either of which may be tilted from the zenith for maximum normal energy incidence and are thoroughly insulated against reradiation, convective or conductive losses of the net absorbed energy. Covers of glass or plastic in multiple or single layers permit the passage of most of the energy in the more intense spectra of 0.2–3.0 microns wavelength and are opaque to or reflect longer wavelengths above 5 microns such as that of reradiation, while insulating against convective losses. Similarly photovoltaic converters have a nonlinier low efficiency response to the shorter wavelength ultraviolet and visible energy spectra up to 1.15 microns, with a peak response at 0.85 microns. The net solar energy thus available for conversion and use in thermal, electric or mechanical systems is basically dependent upon the incident rodient intensity level, times the collector area, times the efficiency of transmittance of covers, less conductive losses, times the absorbtance and emittance and spectral response of the absorbing surface or its efficiency of power conversion, less any losses of energy due to thermal, electrical or mechanical inefficiencies of the collector/converter system. Energy is this power function times the time of production and may be measured in equivalent units of British Thermal units or kilowatt-hours or Horsepower hours.

References may be made to pyranometers, radiometers, or other prior art, solar radiance intensity transducers of many configurations which have remained functionally unchanged over the past several decades but which continued to be technically advanced by an increasing sophistication of modern technology. They have for example become smaller, more accurate and reliable and use new plastic optical materials, thermalvoltaic, thermionic, or photovoltaic sensors, photoelectronic devices, solid-state semiconductors and electronic components to generally improve their basic performance, but at increasing cost. Data processing systems have also been advanced at a remarkable rate so that now a small programable microprocessor or operational amplifier that can be held in the palm of the hand will perform complex data conversion functions automatically and will operate for many hours on a small battery. Similarly, sophisticated recording instruments of many kinds have been developed that are small, mechnical clock motor or battery powered, portable and accurate and can operate in moderate field environments for many hours to produce a permanent record of data of all kinds in digital and analogue formats.

From the need and desire to obtain new measurements and precise data at specific sites or areas for the computation of the available energy or solar system critical design parameters, each of these readily available devices and instruments have been generally contrived into various prior art systems for the metering and recording of the radiant intensity of the sun. Each of these known prior art systems is generally composed of a solar energy transducer and a common recording instrument which has determined the requirements of the data processing elements of the system for the conversion or conditioning of the transducer output signal into convenient measures of hourly average, daily average, total or the instantaneous luminance or radiant intensity values, and then directly into signal levels and kinds required of the specific recorder mechanism. These prior art systems are typically very expensive, technically complex, unreliable, but not entirely self-powered and therefore must have their batteries replaced frequently or are confined in their utility to operation only on commercial or other available electrical power. The recorders now in use must be serviced frequently with replacement components needed to renew their function, and may not function at all in extreme weather conditions. The data collected is often so frequent and extensive that it must be post-processed by lengthly manual planimetrics method or on large scale computers to obtain meaningful information on solar energy levels which adds appreciably to the technical complexity and expense of such measurements. These systems are also a serious maintenance problem due to the need for frequent recalibration of the transducer, poor system reliability and high levels of technical sophistication which require expensive laboratory instruments to calibrate and maintain them. Thus the technical skills generally required to properly install, operate, maintain and utilize the data from these prior art systems are usually those of highly trained engineers and scientists experienced in electronics, data processing, optical pyrometery and solar system sciences. The process of then computing and relating the solar radiance data thus obtained to significant solar system design requirements, performance estimates or the practical consideration of solar energy system alternatives is generally well beyond the capability of most persons of nominal skill.

With the exception of Pyroheliometers and most Radiometers which are configured as sun tracking radiance measuring telescopes, prior art solar radiant intensity metering instruments use transducers which are designed to receive all radiant energy over a full 180 degree hemisphere and serially record total or average energy levels over the entire solar day. They therefore lack directivity or the capability to limit their field of view to only those spherical angles relevant to the direct and narrow diffuse solar radiation required, and when tilted from a horizontal orientation to maximize the incident energy received, are susceptible to specular reflection of energy from the earth and man-made objects in the field of view. Solar Energy Collector Systems are generally not efficient or capable of operating before the sun has reached the usable "solar window" at an angle corresponding to 9 AM solar time or beyond the angle corresponding with 3 PM, and unless specifically designed to utilize reflected energy from a ground-plane reflector to incrase the effective aperature are of the collector, such reflected energy from the earth or other objects is spurious and cannot be relied upon as a design source. Consequently these prior art solar radiant intensity metering systems employing such transducers are not efficient in the selection of the kinds and amount of data that they collect and record to only that which is actually needed. Also the practice of averaging the instantaneous radiance data may lead to seriously underestimating the performance of an actual Solar Energy Collector System which would have far greater thermal-inertia or integrating capacity than any of the transducer sensors commonly employed. Therefore, the continuous automatic integration of instantaneous measured values and use of high thermal-inertia sensors is preferred, but not implemented in known prior art systems.

Sensor degredation is a common fault among prior art pyranometer transducers. They are normally composed of a painted surface in Parsons Black with coupled thermopiles, or black and white alternate stripes, or may be a black absorbing surface with contact thermocouples or thermionic voltage generators. These painted surfaces change properties when exposed to continual sunlight and periodically require return to the factory for renewal or replacement. Silicone solar photovoltaic converters also degrade permanently when thus exposed to the sun and atmosphere over long periods of time and therefore require at least annual replacement of the sensor element. Domes and covers on these instruments must be cleaned periodically, and when made of certain plastics are susceptible to ultraviolet induced changes in spectral transmittance or permanent physical damage and should be replaced annually. Therefore, these prior art instruments all require frequent calibration and maintenance as is recommended by the World Meteorological Organization. Otherwise, sensor absorbing surfaces and cover domes should be carefully designed and constructed of such materials that do not degrade when operated in their intended environment. Also, the instruments must be sealed against moisture or use desiccant to prevent evaporation or ice formation within the cover dome which would reduce the measured solar radiant intensity and may result in corrosion of sensor surfaces, thermopiles or bimetalic thermionic generating devices and chemical reactions with painted surfaces. Only the most expensive prior art instruments are so constructed to minimize moisture damage and no known instrument has a non-degrading ideal radiant energy absorbing surface. An ideal absorbing surface would be one which is spectrally broad wavelength sensitive, of a constant performance non-degrading surface whose absorbtance is near 99 percent and emittance, or reradiation of energy, is less than 1.0 percent. Such surfaces exist in research laboratories but these have not been put to practical use in prior art solar radiance measuring instruments.

It is a common prior art practice to utilize the existing solar radiance or insolation data which has been collected almost casually at some universities and meteorological stations widely scattered across the country, and to extrapolate an estimate of the site-specific available solar energy. These measurements have been made infrequently over a short period of time with poorly calibrated instruments and systems and are recorded as average monthly values without regard to the possible end-use of the data. Thus the estimates derived from this data are gross to begin with, and any extrapolation of data between widely separated geographic locations could have enormous errors due to the unique climactic differences in the sites. To overcome some of this deficiency in usable data, elaborate standard data tables, mathematical formulations, analytical simulations and standard methods of estimation have been recently developed by Government and private professional institutions. Even though these methods tend to reduce the total likely error of estimation they are compromised by the limited data format and applicable only to very long-term conservative estimates of average solar collector system performance, which are independent of the climatology, not precise and have typically underestimated the actual usable energy levels that may be obtained by as much as one-half. This has resulted in expensive errors in experimental system design and could lead to inhibiting the effective dvelopment and public acceptance of this important unlimited energy resource. Thus, what is required are new instruments for the accurate measurement of solar energy levels and actual power production potential of collector systems located at specific sites which are versatile, reliable, inexpensive and can be successfully operated by persons of nominal skill to directly obtain the required Solar Energy Collector System performance data.

THE INVENTION

The general purpose of this invention is to provide a unique Solar Energy Metering and Recording System having all of the desired features and capabilities for the accurate direct measurement and recording of solar energy and power functions, which may be self-powered and which system is a significant improvement upon, and possess all of the requirements and advantages, and none of the aforesaid described disadvantages and limitations of similarly employed prior art systems and methods. To attain this purpose, the Solar Energy Metering and Recording System embodying this invention includes:

A unique transducer means of directionally limiting the field of view to the "solar window" and detecting the solar radiant energy levels over the full spectral range required which embodies a broad spectra non-degrading ideal absorber surface, non-degrading covers, is insulated and sealed against moisture, may be mounted with optical filters for selective spectra measurements, which is ambient temperature limited and electrically and thermally compensated to produce or otherwise generate a voltage linierly proportional to the incident solar radiant intensity levels of the sun. This transducer means which is normally elevated above surrounding obstructions of the sun, is tilted and oriented so as to optimally view only the annual solar window between the hours of 9 AM to 3 PM solar time, thus restricting its function to only the most usable direct and narrow diffuse solar radiant energy. Long conductors convey the solar radiant intensity proportional voltage to the remaining metering and recording elements of the system contained in a suitable weather resistant enclosure or interior space located at or near a convenient surface point.

Within the aforesaid enclosure and connected to the terminus of the long conductors which convey the solar radiant intensity proportional voltage from the remotely located transducer means are a means of sensing the level of this voltage, or consequently the solar energy intensity level, and selecting a threshold of initial operation of the metering and recording functions, this threshold being uniquely derived and programed in values which may be adjusted over a wide range from some minimum representing near zero energy level up to and beyond the initial operating level of typical Solar Energy Collector Systems.

A computer means of electronic and electrical character is connected to the threshold means for the conversion of the solar radiant intensity voltage directly to an energy-density analogue voltage function that is equivalent to the amount of incident energy per unit area of a collector surface, and with the proportional modification of this analogue voltage by the selection of one or more programs or scaler functions, such selection being provided by a programing means, does result in a measurement of the actual energy levels that would be incident upon a solar collector surface of given aperture area. The programing means may also introduce a variety of separate computer functions individually or in combinations that further modify the energy-density analogue voltage function to equal or closely approximate the effects of one or two cover plates of various materials, the energy conversion efficiency of the collector surface, radiant, convective and conductive energy losses, mechanical or electrical efficiencies and other factors which replicate the performance characteristics of actual known or typical Solar Energy Systems for the production of thermal, electrical or mechanical power.

A unique recording means is connected to the computer means via a metering function and range selection means, to provide a permanently preserved record of the sum total of the incident solar energy or power levels measured, whose instantaneous values are integrated continuously over a desired or convenient period of time, which recording means is a simple reliable device of electrical character that is actuated entirely by its recorded values only and may be reset for each period of may continue to integrate these energy or power measurements for a subsequent period of time.

A monitoring means may optionally be provided with which means the instantaneous values of solar radiance, energy-density or power levels may be displayed and measured in selectable scales and units upon the face of a typical display means such as a common moving coil permanent magnet movement meter or intensity modulated light device. This monitoring means may be portable, co-located with the aforesaid system means or may be remotely located and interconnected to the system via long conductors. Similarly a monitor and calibration means within which an active voltage source is provided that is adjustable and may be selectively introduced at any appropriate point within the system while simultaneously monitoring the descrete system functions, which means would be employed to calibrate the system and assure the accuracy of the data, proper operation and the performance of each system function, the adjustment of programed selections or as a means of fault location diagnosis and maintenance.

Therefore, it is an object of the present invention to provide a new, unique and substantially improved Solar Energy Metering and Recording System of the character stated which is intentionally designed for the purpose of practical direct evaluation of the site-specific performance, design requirements, and energy or power potential of typical or known Solar Energy Collector Systems, and may be self-powered and adapted to operate unattended and continuously over long periods of time without degradation in extended use in any remote field location for the accurate measurement of the desired information, which system is simply composed promoting reliability and substantial economy in production and use, is complete and versatile to perform all of the significant measurement functions required and which directly records the resulting data necessary for such specific site evaluations.

It is another object of the present invention to provide a system of the character stated which obtains solar energy or power measurements directly in their specific units of measure which are programed and computed internally in mathematical functions and ranges representative of the actual performance of typical Solar Energy Collector Systems for the production of thermal, electrical or mechanical power: so as to eliminate the need for off-line data processing of solar radiance data in elaborate methods and complex computerized mathematical formulations or the use of crude data approximation methods and extrapolations. Thus minimizing the technical skills required to make such accurate measurements and use the information in evaluations, limiting the chance of error in data processing, eliminating the reliance upon expedient compromises in accuracy because of limited data of the wrong format and kind, maximizing the utility and versatility of the system in a variety of programable and readily implemented configurations that can match the variety of potential applications or alternatives to be evaluated.

It is a further object of the present invention to provide a Solar Energy Metering and Recording System of the character stated which embodies as the primary source of output data from the system means of selectively recording the measured information as the sum-total of the instantaneous values of solar energy or power levels that are integrated continuously over a convenient or desired period of time, which recording means is reliable, will operate in extreme weather conditions, may easily be reset for a subsequent period of time without replacement of components and thus extending its function virtually without limit. Such recording means typically composed of a unique reliable device of electrical character such as a mercury coulometer which is actuated entirely by its measured values only.

It is still another object of the present invention to provide a Solar Energy Metering and Recording System of the character stated for which a means is optionally provided for the continuous or periodic monitoring of selected instantaneous values of solar radiant intensity, energy or density or power levels, and for the periodic calibration and measurement of proper operation of each system function and program selection, or as a means of fault diagnosis isolation and maintenance. Such monitoring and calibration means to be self-contained, simply and reliable implemented for operation by lay-persons of nominal skills without supplementary instruments for the assurance of data accuracy, proper system operation, reliability and ease of maintenance.

Other objects and features of the present invention will be apprehended from the following description of the preferred embodiment of the system taken in conjunction with the annexed drawings.

DESCRIPTION OF PREFERRED EMBODIMENT

Figure 1:
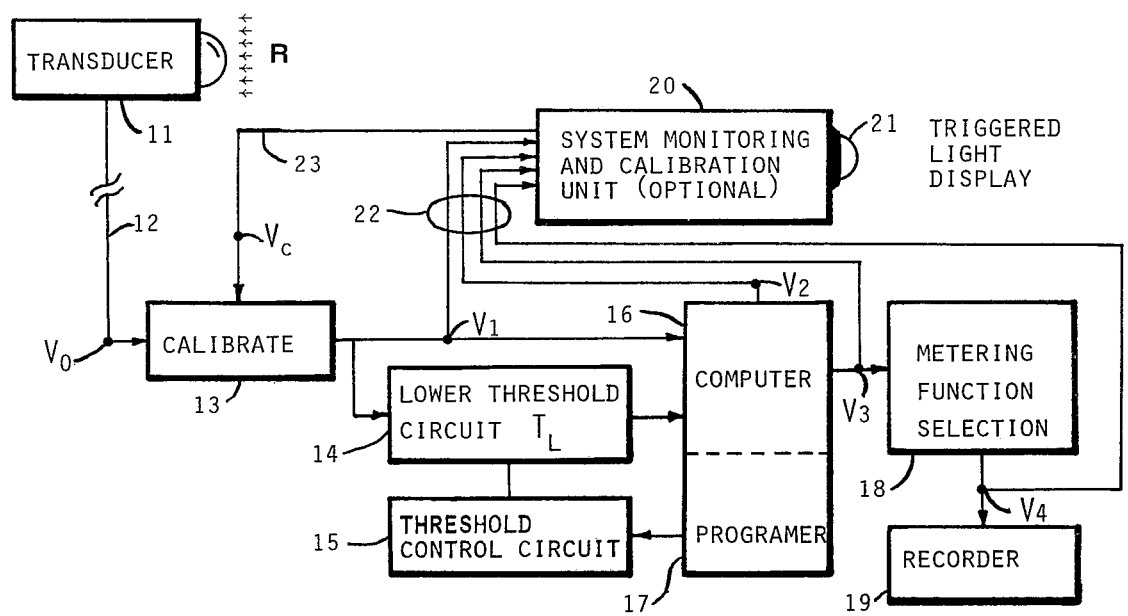
FIG. 1 is a functional block diagram generally depicting the Solar Energy Metering and Recording System constructed in accordance with and embodying the present invention.

Referring now by reference and designated characters to the drawings which illustrate the present invention and its preferred embodiment, R generally indicates the presence of solar radiant energy in FIG. 1 whose intensity level is to be measured and recorded by the system diagramatically depicted in this drawing, and which radiant energy R having both a diurnal and a long term statistical charcteristic imparted by sun and atmospheric conditions may momentarily be constant, increasing or decreasing in intensity in an irregular random manner. For the purpose of illustration only in this description it may assumed that this radiant intensity R is increasing in a linier manner between zero and some higher value within the range of operating characteristics of each system function. Be it understood, however, that this does not imply or specify a limit of the character or the range of the solar energy over which the system may perform its functions or is capable of operating.

The Solar Energy Metering and Recording System generally depicted in the block diagram FIG. 1 is a self-powered analogue configuration which includes: a Transducer 11 that detects the level of incident solar radiant energy and generates a voltage $V_o$ that is a consistant proportional function of the radiant intensity of this solar energy; a Calibration Circuit 13 which facilitates the adjustment of the system accuracy and operating values; a programable Lower Threshold Circuit 14 with Threshold Control 15 which may be set to limit the metering recording functions of the system to the higher levels of energy desired; a Computer 16 and Programer 17 which are capable of performing the variety of analogue mathematical functions upon the calibrated radiant intensity analogue voltage $V_1$ needed to obtain direct measures of energy-density represented by analogue voltage $V_2$, or to replicate the full performance of typical Solar Energy Collector Systems represented by analogue voltage $V_3$ for the measurement of thermal, electrical or mechanical power produced; a Metering Function Selection 18 which scales these energy or power level analogue voltage values to the desired units and ranges; a Recorder 19 which may produce a permanent record of the sum-total of selected instantaneous energy or power levels which are integrated continuously over a convenient period of time; and an optional Monitor and Calibration Unit 20 with Triggered Light Display 21 for the continuous measurement of instantaneous solar radiant intensity, energy density or power levles, the assurance of proper system operation and adjustments and the periodic calibration of the system. In this preferred embodiment of the system to be further described, this logical order of arrangement is considered the least complex to implement and is thus presented for illustration purposes and is not intended to limit the possible alternate arrangements of these components to only this configuration. For example, of several of the circuits, the Lower Threshold Circuits 14, 15 could be designed to follow the Computer 16 or the Metering Function Selection 18 if desired in an alternative arrangement.

Figure 2:
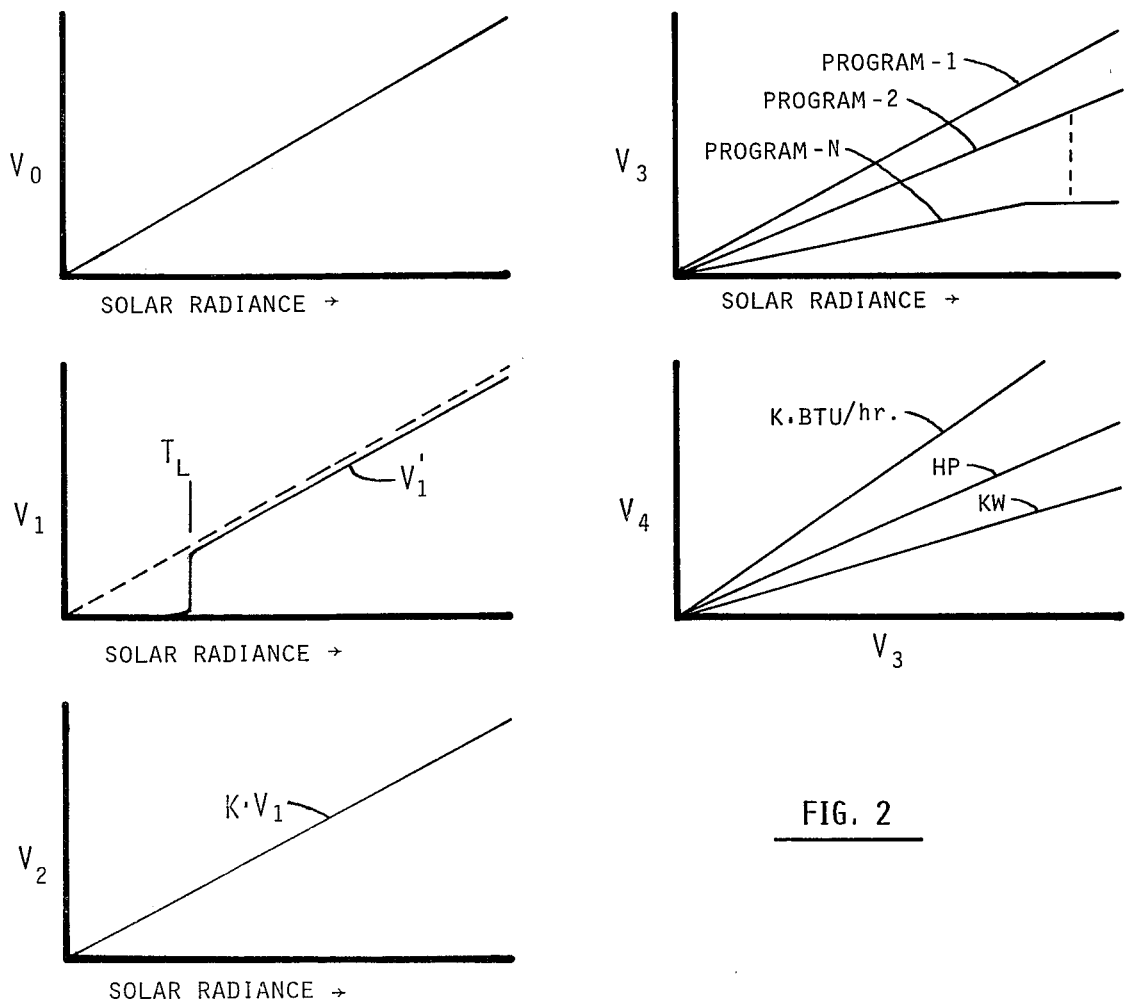
FIG. 2 is a voltage form diagram which illustrates the analogue processes within the preferred embodiment of the system at selected key points.

The progression of typical analogue voltage functions at each key point through the system is illustrated in FIG. 2. Here if the radiant intensity R of the solar energy incident upon the Transducer 11 is linearly increasing, the solar radiance analogue voltage $V_1$ would follow in typically a linear manner once the absorbing surface temperature had exceeded the ambient temperature level. The thermal inertia of the absorber would cause a slight delay time in this response and would tend to integrate out rapid variations, (i.e. due for example to a cloud passage) in solar radiant intensity and behave in a manner identical to that of the absorbing surface of a typical Solar Energy Collector System. The initiation of metering at a preset lower threshold of operation is illustrated by $V_1'$. The solar energy-density analogue voltage $V_2$ is the output of an operational amplifier embodied in the Computer 16 and is a function of the solar radiant intensity level times a constant. The Programer 17 further modifies the energy-density analogue voltage $V_2$ to provide a variety of Computer 16 output functions $V_3$ which are programed to replicate descrete design characteristics of typical or known Solar Energy Collector Systems or other solar energy powered devices, as may be desired to be recorded. The analogue voltage $V_4$ is the equivalent to the energy or power values input to the Recorder 19 by the Metering Function Selection 18 which is adjusted to a linier function of $V_3$ needed to obtain the desired specific units of thermal, electrical or mechanical power and ranges of scale. These system elements and voltage forms will be further explained in the following detailed description of the system.

Figure 3:
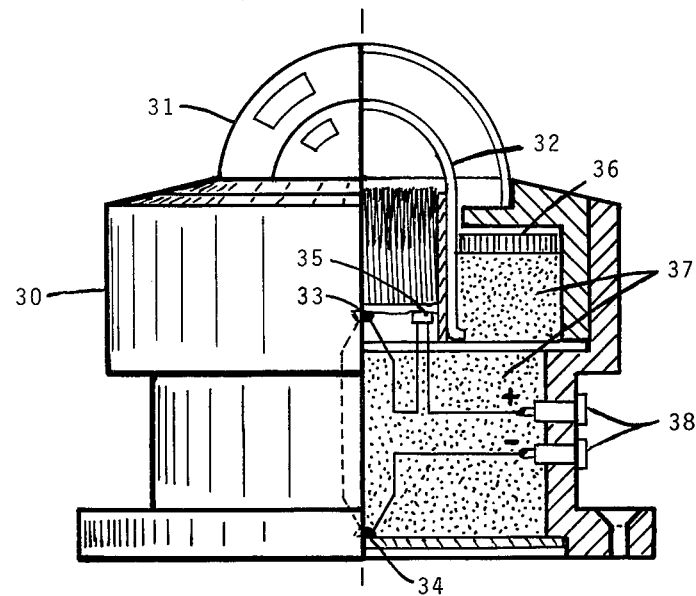
FIG. 3 is an assembly cut-away diagram/electrical schematic form drawing of the transducer construction and elements.

Continuing in reference to FIG. 3, the Transducer 11 is composed of a Housing 30, the Solar Energy Sensor 33 and a corresponding Ambient Temperature Sensor 34. The Thermister 35 within the Energy Absorbing Assembly 32 corrects for non-linearities in the voltage $V_0$ produced by the Solar Energy Sensor 33. Desiccant Moisture Absorbant Tablets 36 may be positioned within the interior of the Housing 30 of the Transducer 11 as needed. Appropriate Insulation Material 37 surrounds the Energy Absorbing Assembly 32 and completely fills the interior cavity of the Transducer 11 assembly. Electrical Connectors 38 are provided on the exterior of the Housing 30.

The dome of the Dome Assembly 31 and domed container for the Energy Absorbing Assembly 32 may both be composed of high quality optical glass having near unity internal transmittance over the spectral range from approximately 0.2 to 3.0 micron wavelength and which also have a high reflectance to the long wave reradiation spectra above 5 microns, thus they do insulate the Energy Absorbing Assembly 32 from convective energy losses and reradiation losses. By mechanically separating and insulating these glass fixtures from each other, conductive losses may also be virtually eliminated. Radiant solar energy incident upon the area between these two domes is reflected away by a bright mirror surface plated upon the plastic or other non-thermal-conductive material of the Dome Assembly 31, thus assuring that the only energy levels being measured are those directly incident upon the Energy Absorber surface of Assembly 32.

The Energy Absorbing Assembly 32 is housed within a sealed test tube shaped optical glass container and may be composed of a bundle of very sharp needles mounted in a retainer and employed as the absorber surface; a thermopile, thermocouple or other typical thermal responsive Solar Energy Sensor 33; and a semi-conductor resistive temperature compensator such as typically a Thermister 35 which linierizes the output voltage as a function of the temperature of the energy absorber. This energy absorber, to be further described, imparts several unique and highly desirable capabilities to this invention which are major improvements upon all known prior art pyranometer instruments and transducers, although it may also be composed of typically a rough, black oxide surface, Parsons Black painted surface, black-chromium plated surface or the like. The following preferred energy absorber may be readily assembled without special tooling or manufacturing capability by literally tightly stuffing a retainer composed of a brightly plated thin wall metal or plastic tube with hundreds of nickel plated sharp three-taper eyeless needles which are typical and readily available. Thermal conductive cement may be used to hold the stub-end of the needle bundle together, lock it in place within the tubular retainer, and to secure the Solar Energy Sensor 33 and Thermister 35 closely in thermal and mechanical contact with the end of the needle bundle. Viewed from the pointed end, this surface is totally absorbing of all incident energy over a wide angle of orientation, including visible light, and is capable of absorbing this energy over an extremely broad spectral range of wavelengths beyond that required of the system. It is also unidirectional corresponding to the "solar window" and sharply rejects by reflection nearly all radiant energy received at an angle of greater than approximately ±45 degrees from its axis. Being brightly nickel plated, each needle within the bundle is a poor reradiator of thermal energy with an emittance of less than 0.5 percent. Thus it is in fact an "ideal absorber" having all of the desired characteristics and properties required of this invention, including a high thermal-mass capable of integrating rapid variations in the intensity of incident radiant energy just as would a Solar Energy Collector System. It is also a nondegrading absorber surface when in continual exposure to direct sunlight and, when sealed against moisture or chemical corrosion, will retain its absorbing properties and calibration indefinitely. Although there is no serious need for selective optical coating of the absorber surface in this design, each needle may also be lightly coated with a clear silicone surface to further reduce its thermal emittance.

Ambient temperature compensation is provided by a brightly plated or polished metal plate located at the back or bottom of the Transducer 11, to which is affixed an equivalent Ambient Temperature Sensor 34 which is electrically connected in series with the Solar Energy Sensor 33 so as to produce a negative voltage or counter electromotive force of less than that of the higher temperature positive voltage Solar Energy Sensor 33. Thus when the energy absorbed is entirely due to ambient heating of these two sensor devices the net voltage generated in zero, and increases with proper polarity only when incident solar energy is being directly received. This plate could also be the cold-junction sink of a bimetalic thermionic voltage generator or thermopile used instead of 33 and 34.

The bright metal ambient temperature detector plate also reflects radiant energy which might be received from the earth, a building or reflected from water, snow or man made objects located in the field of view in reverse direction from the sun. Conversely, if the Transducer 11 is to be mounted on a sloped roof upon which a Solar Energy Collector System will ultimately be installed, this plate may be painted black and the polarity of the sensor reversed by the user so as to absorb and register as additive the radiant heat loss which would normally occur from the building, and thus better duplicate the actual performance of the Collector System. This needed versatility may be provided by jumper connections located on the exterior of the weather resistant transducer Housing 30 or within a plug connected to the Electrical Connectors 38.

Long Conductors 12 convey the fully compensated and linierized solar radiant intensity proportional voltage $V_o$ output from the aforesaid remotely located Transducer 11, down to the remaining metering and recording elements of the system conveniently located at or near the surface within a weather resistant enclosure. The terminus of these long conductors 12 are directly connected to the Calibration Circuit 13 depicted in FIG. 1 where the voltage loss due to the length of the conductors is corrected for by an adjustable resistance and a switch may be provided to select as input to the metering and recording elements of the system either the solar radiant intensity proportional voltage $V_o$ derived from the Transducer 11, or the Calibration Voltage $V_c$ derived from the Monitoring and Calibration Unit 20 via Conductor 23. The output voltage of the Calibration Circuit 13, $V_1$ may be directly connected to the Lower Threshold Circuit 14 and the Computer 16.

Figure 4:
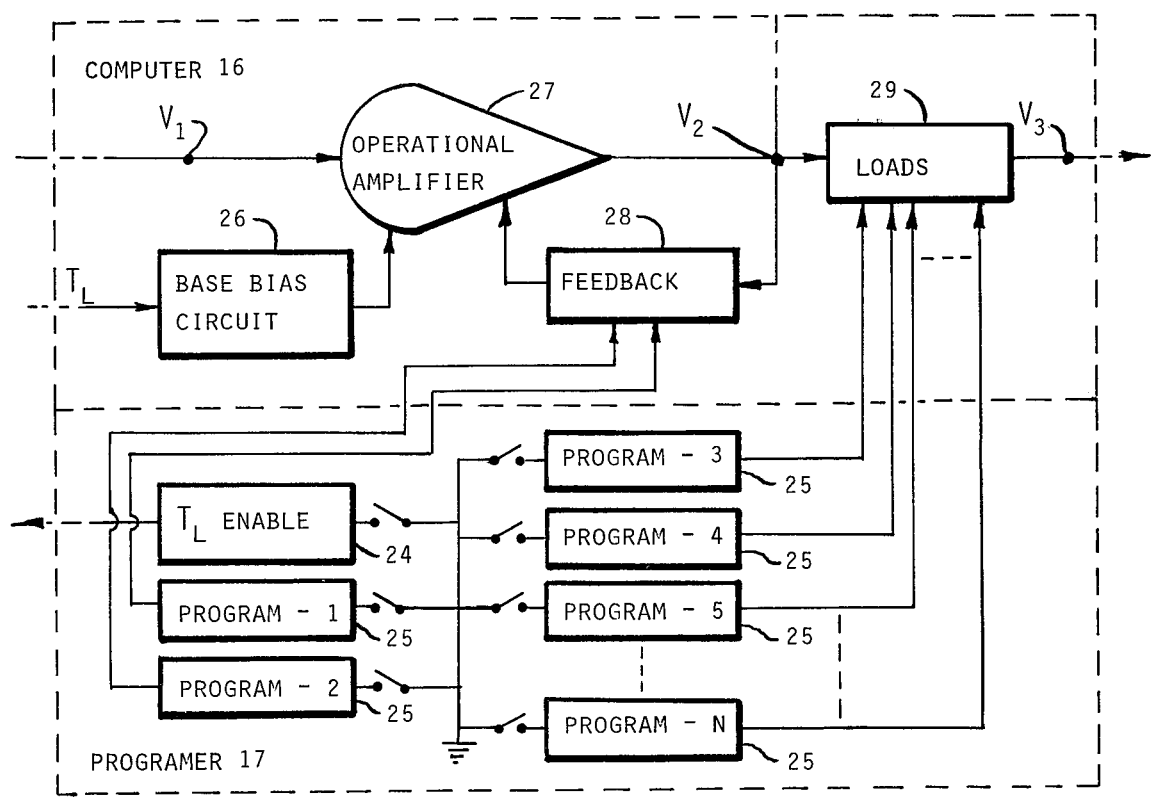
FIG. 4 is a functional block diagram of the computer and programer circuits and includes the lower threshold enable program.

Referring now to FIG. 4, the Lower Threshold Circuit 14 and Threshold Control Circuit 15 may be implemented directly in conjunction with the Base Bias Circuit 26 of the Solid State Operational Amplifier 27 of the Computer 16. The Lower Threshold level indicated $T_L$ sets the initial bias point of conductance of the Operational Amplifier 27 whose output voltage $V_2$ may be adjusted as desired to initiate ON at any point selected by the Threshold Control Circuit 15, as the solar radiant intensity proportional voltage $V_1$ increases up to and beyond a level representing the onset of operation of a typical or known Solar Energy Collector System, such minimum levels being normally specified by the manufacturers of solar panels or other solar powered devices, or may be determined by the practical minimum design temperature of a solar system.

The Threshold Control Circuit 15 for the lower threshold of operation $T_L$ may be most simply implemented by a preset variable resistance voltage divider which is enabled by the $T_L$ Enable 24 program located in the Programer 17 and thus programed into or out of the Base Bias Circuit 26 of the Operational Amplifier 27 as desired by selection in the programer 17. When $T_L$ is not enabled or is programed out of the Base Bias Circuit 26, the normal base bias point of the Operational Amplifier 27 is set for conductance at near zero levels of $V_1$. The Threshold Control function could be derived similarly from any appropriate sharp cutoff solid state switching device such as a Transistor or Silicone Control Rectifier or biased Diode Circuit in the lower Threshold Circuit 14 whose switching level is pre-set by the Threshold Control Circuit 15. There may always be some small residual clipping of very low levels of $V_1$ in the self-powered embodiment of the system which does not detract from the stated objects of the invention and could be circumvented if deemed necessary by reverting to a battery powered Operational Amplifier configuration.

Before proceeding with this description it is appropriate to specify that the subsequent elements of the system to be described in detail are not "signal conditioners" as are common to prior art systems, but rather are analogue computer elements which perform mathematical functions upon an energy density analogue voltage $V_2$ output from the Operational Amplifier 27 which is a linear or non-linear consistent voltage function representative of the instantaneous energy level per unit area of the incident solar radiation or solar energy conversion functions as would be modified by the system being replicated, or simulated, through the programs introduced by Programmer 17. It is well understood in the art of analogue signal processing that the injection of output $V_2$ voltage feedback in a negative or positive relationship to $V_1$ into the input of the linear and stable Operational Amplifier, of the kind specified in this preferred embodiment, and by varying the loads or coupling this feedback through linear and/or non-linear electronic circuits, typically resistors, diodes or transistors operating in low voltage non-linear conductance regions, one may obtain a versatile "function generator" form of mathematical relationship (linear, square law, cube law, etc. and combinations thereof) between the input voltage $V_1$ and output $V_2$ of such a device. It is also a well known mathematical principle that all mathemtaical functions may be expressed by what is called "series functions" which, when properly formulated as the summation of liner and exponential variables and properly bounded, will approximately (or exactly) duplicate those functions. These two well known principles are employed in the following description of the preferred embodiment of the immediate invention. It is also well understood as common video, digital-video and digital data processing arts that signal manipulation in circuits capable of amplitude, transient form, frequency or as binary coded decimal or digitally coded mathematical functions, may readily be combined to produce a similar linear or non-linear mathematical computational relationship between input and output data which may then be easily converted to an analogue form for recording actual values using the mercury columeter.

Thus, in the true sense the Computer 16 and Programer 17, the Metering Function Selection 18 and Recorder 19 are all operating typically as mathematical analogue computer elements which are uniquely self-powered entirely by the output voltage of the Transducer 11 in this self-powered preferred embodiment of the system. It is generally well understood however, that these analogue computing elements could easily be duplicated functionally by typical conventional battery powered analogue circuits or digital devices and microprocessor computer circuits, individually or collectively in a large scale integrated circuit (LSI), although the possibility of doing so in low cost, simple and reliable system configuration which meets all of the objects of the invention does not appear feasible at the present state of the art. The general nature of the invention described herein does not however, preclude these as alternative embodyments of the system or its elements although they may not be expressly described in detail in the preferred self-powered self-embodyment of the system.

To continue the description in reference to FIG. 4, the Computer 16 may be composed of an Operational Amplifier 27, as previously discussed, and its associated Base Bias 26, Feedback 28 and Load 29 circuitry and components which have a linear or nonlinear low voltage gain characteristic that converts the solar radiant intensity proportional voltage $V_1$ into an energy-density analogue voltage $V_2$ proportional to the energy level per unit area incident upon a collector surface or as might be converted by a solar system to usable thermal, electrical or mechanical power. It is not uncommon to implement such low voltage Operational Amplifier circuits using high quality FET or C/MOS solid state device having exceptional linearity, stability, low operating voltage levels and large current gains. In this self-powered embodyment net gains of less than one may be accommodated, but thermal instability cannot. Therefore, some form of ambient temperature compensation in the form of a thermister may be required in the Feedback 28 circuit to guarantee the linier response of the Operational Amplifier 27 over all field environmental conditions of operation.

The Programer 17 in FIG. 4 is closely associated with the Computer 16 Operational Amplifier 27 to selectively modify its analogue voltage output $V_2$ characteristics further and to adjust the range of computer output values $V_3$ in such a way as to adapt the Computer 16 functions to a variety of desired applications. Several discrete devices, resistive loads, voltage divider networks and other typical analogue programing elements and identified programs 25 similar to the aforesaid threshold enabling circuit and designated Program 1 through Program N in FIG. 4, may be manually switched into the operation of the Computer 16 by the Programer 17 as required, singularly or in combinations, to explicitly match the functions and characteristic effects desired to replicate the actual performance of typical or known Solar Energy Collector or other solar powered devices producing usable thermal, electric or mechanical power. For example these explicit Programs 25 may typically include the functions of the transmittance of cover plates provided by voltage attenuators, energy level attenuation, if appropriate or desired, which is due to atmospheric density at the altitude or latitude of metering; the collector energy losses due to reflectance, reradiation and convective and conductive propagation away from the collector may also be provided by attenuators; nominal surface area of the collector system may be provided by resistance loads which in effect increase the computer output $V_3$ by a factor proportional to the collector area; collector energy conversion efficiency due to absorbtance and emittance and the efficiency of mechanical, electrical or thermal devices used to generate power may each be derived by circuits and/or resistive attenuators manually switched into or out of the Feedback 28 or Load 29 Circuits as required by such manipulation of the Programer 17.

To achieve further simplicity of design of the Computer 16 and Programer 17 such linear or non-linear additive or subtractive programs as the sum of the collector system efficiencies, energy losses or the like may be preset in a single Program embodying a calibrated variable attenuator with explicit instructions provided for proper selection and adjustment. In this case the optional Monitoring and Calibration Unit 20 could become a mandatory part of the system. Similarly, to achieve further simplicity of design, nonexplicit and adjustable or fixed Programs 25 could be used in combinations and permutations to expand the total number of explicit functions obtained without increasing the total number of individual programs. Thus it may be understood that the versatility required of the system is achieved by a few simple analogue devices and circuitry which may be combined properly within the analogue Computer 16 and introduced by the Programer 17 of the preferred embodyment of the system to obtain all of the desired functions. It is generally understood that other analogue circuits or the digital computer counterparts comprising mirco-processors, read only memories (ROMs), or video-digital circuits comprising adjustable multivibrators, flip-flop and bootstrap signal processors and digital-to-analogue combinations, or equivalent of these system elements may also possibly be implemented to obtain the desired functions but would tend not to be self-powered and would require complex computer circuits with rigorous programing disciplines needed to achieve the same number of explicit functions.

Referring now back to FIG. 1, the Metering Function Selection 18 provides a means of selecting energy or power measures and scalers for input to the Recorder 19. Said Metering Function Selection 18 is basically composed of switches and attenuators for the linier mathematical conversion of the energy density or power analogue voltage output $V_3$ from the Computer 16, to units of direct measurement of electrical, mechanical or thermal energy; i.e. Kilowatt-hours, Horsepower-hours or British Thermal Units respectively. Simple resistor networks provide a division of the Compurter output analogue voltage $V_3$ into the linier analogue relationships of these power measures and then to attenuate the values to a voltage $V_4$ corresponding with the operating characteristics of the recorder for the desired full scale reading. The operating characteristics of the recorder must be understood before this can adaquately be described.

The Recorder 19 of the preferred embodyment of the system is invisioned as a simple, small, reliable and commercially available device which will operate in extreme weather conditions termed a "Mercury Coulometer": (ref. U.S. Pat. No. 3,655,308-Curtis) that is composed of a capillary tube containing mercury and a tiny drop of electrolyte liquid. A DC voltage is introduced across the mercury column within the capillary tube and, as current passes through the mercury and the electrolytic drop, a molecular migration of the mercury from one side of the drop to the other occurs in one direction, dependent upon the direction of current flow. Thus the drop of electrolyte appears to move along the capillary tube at a rate proportional with the current flow. By carefully controlling the chemcial composition and size of the electrolytic drop a well calibrated elapsed time, amperehour, watt-hour or energy recorder may be simply devised from this device for a given voltage level applied. It would require, for example, a constant 3.2 microamperes current flow for 1000 hours to displace the electrolytic drop exactly 178 inch. Thus applying shunting and series resistance to $V_3$ introduced in the Metering Function Selection 18, to properly selected scaler values in a circuit containing or input to this recording device, it may effectively be used to meter and record the scaled analogue voltage $V_4$ directly in values of energy. The Recorder 19, by the nature of its operation, will functionally integrate these instantaneous power values continuously over the desired period of time and record them as fractional inches of migration of the electrolytic drop through the capillary tube. Accurately measuring or observing the position of the electrolytic drop and by sliding an affixed calibrated ruled scale along the capillary tube the Recorder 19 may be reset to zero at each reading or may continue for any desired period of time. When the electrolytic drop approaches the far end of the capillary tube it may simply be turned end-for-end and reset to zero to renew the recording function, and this may be done over and over again indefinitely. It will be understood that any other recording device or instrument may also be employed for applications in which the advantages of the Mercury Coulometer recorder device are not required.

Although all of the preceeding described elements constitute a Solar Energy Metering and Recording System, it is not a complete system meeting all of the objects of the invention unless some optional means is also provided for the Monitoring and Calibration of System performance and facilitating adjustments. The Monitor and Calibration Unit 20 of FIG. 1, may be of relatively conventional character and be portable for field use, co-located with the preceeding described system metering and recording elements, or remotely located as desired by the user. It may be simply composed embodying typically a common moving coil-permanent magnet meter an LED numerical display and associated meter scaling resistances and selection switches connected to the system by multiple conductors 22 to monitor sequentially or continuously on the face of the meter any selected voltage $V_1$, $V_2$, $V_3$, or $V_4$ in units of solar radiant intensity energy density or power. This monitoring function may also be used to periodically calibrate the system by applying an adjustable calibration voltage $V_c$, derived from typically a battery or other active voltage source and which $V_c$ is introduced into the Calibration Circuit 13 of the system via Conductor 23, while sequenttially monitoring the voltage response of each of the elements of the system and adjusting the previously described system calibration, threshold, programing, metering functions and scaling circuits and selections as may be required. Leaving the monitor selection switch in only one position, the instantaneous values of solar radiant intensity, energy density or power selected may be continuously observed or measured on the appropriate meter scale.

A Triggered Light Display 21 may also be implemented in the monitoring function of the Monitoring and Calibration Unit 20 by installing a circuit similar to the Threshold Control Circuit 15 in conjunction with an LED Lamp or other illumination source in which the calibration voltage source or battery is alternatively connected to this circuit and a common solid state switching device is employed to trigger this light display device ON at any preset threshold voltage value desired and in which Light Display 21 the intensity of illumination could visually be approximately proportional to the energy density or power levels being monitored. The threshold trigger level for the light display may be selectively determined by a variable trigger level control resistance in the base bias circuit of the solid state switching device such as a switching transistor, silicon control rectifier or unijunction transistor. This Triggered Light Display 21 would thus indicate to an observer that solar energy or power levels of interest were present and qualitatively of approximately a given level of intensity.

It is also understood that the monitoring meter or Triggered Light Display 21 could be implemented separately as alternative monitoring functions, or to operate separately or simultaneously in the same monitoring function. The calibration of the system would be appreciably simplified when using the Triggered Light Display 21 and could be implemented for example, using a well calibrated threshold setting dial on the trigger level control resistance which may be adjusted in conjunction with the application of the calibration voltage $V_c$ to the Calibration Circuit 13 so as to just trigger the light ON at a predetermined setting of the dial while at the same time the Triggered Light Display 21 is switched sequentially to monitor any one of the voltages $V_1$, $V_2$, $V_3$, or $V_4$ of the system. It is understood that any common configuration of analogue or digital counterparts for the Monitoring and Calibration Unit 20 of the character described could also be functionally implemented from conventional meters or digital volt meter and display devices and circuitry, with associated switches and scaling circuits for selecting and properly displaying the appropriate instantaneous values of solar radiant intensity energy or power levels which may be monitored, calibrated or adjusted in either digital or analogue system embodyments.

It will be readily apparent to those skilled in the art that many variations upon the configuration described in the foregoing preferred embodiment of the system may be made by simply changing the arrangement or sequence of system elements, their size, number, shape, types, values or kinds of component parts such as the battery internally powered analogue video-digital, or digital alternatives given, and that functions could be added, modified or deleted in the implementation of the system without departing from the spirit, scope or intent of this invention. Also, for example, a scientific interest in measuring the spectral distribution of the radiant intensity of the sun could be achieved by multiplicity of systems each with a different sharp cutoff optical filter dome, as previously discussed, the difference in recorded values of which would be the energy received only in the spectral bands of interest. Similarly, by masking the transducer absorbing surface using reflecting metalic tape across the dome, only the diffuse radiant energy in the field of view or solar window could be measured, as could be also attained by orienting the directional transducer to face an upward or northern hemispheric window of energy reception while shading the absorbing surface from the direct sun radiance.

It will thus be understood that the objects of the invention set forth above, among those made apparent from the preceeding descriptions, are each efficiently attained. Since certain variations may be made in the preferred embodyments set forth without departing from the scope and objects of the invention, it is intended that all matter contained in the above descriptions shall be interpreted as illustrative and not in any limiting sense.

May it also be understood that the following claims are intended to encompass all of the generic and specific features and functions of the invention herein described and all statements of the scope of the invention which, as a matter of language, might be determined or interpreted to lay therein.

Having thus described the system constructed in accordance with and embodying the present invention, what I claim and desire to obtain by Letter of Patent is:

1. A system for directly metering and recording the energy density or power potential of incident solar energy comprising:
   a. a transducer means for detecting the presence of solar energy and which means is solar windowed unidirectional, embodies an ideal absorber, is ambient temperature compensated and responsive to and accurately follows the radiant intensity levels of the sun to generate or to otherwise produce a voltage that is a precise linear function proportional to the radiant intensity of the incident solar energy,
   b. a lower threshold means connected to the transducer means which may be enabled and adjusted as desired to initiate the metering and recording of the solar energy levels to only that above a preset lower intensity limit, or optionally not enabled,
   c. a computing means connected to the threshold means and transducer means which accurately computes the solar energy-density levels in a precise mathematical relationship which means may be programed for a variety of computational functions,
   d. a programing means connected to the computing means by which the computer may be versatilely programed for numerous computational functions required to correct for atmospheric density, latitude or altitude, replicate descrete or combined performance characteristics of typical or known solar Energy Collector Systems or other solar powered devices, with which means the threshold limits are selected or enabled and by which means the energy-density level of the radiant intensity of the sun may be programed for computation into specific energy or power measurement values,
   e. a metering function selection means connected to the computing means by which to selectively adjust the values of energy-density, energy or power levels computed to the desired units and scales appropriate to the characteristics of the recording of thermal, electrical or mechanical energy or power units of measure,
   f. a recording means connected to the metering function selection means composed of a mercury coulometer by which the sum-total of the instantaneous energy or power levels metered may be integrated continuously over a desired period of time, which recording means may be easily reset for any subsequent period of time, additional outputs may be provided from this means for connection to a common brush recorder, magnetic tape recorder or the like where the advantage of the mercury coulometer recorder are not desired,
   g. a optional system monitoring means connected to appropriate points within the aforesaid system means by which the instantaneous values of solar radiant intensity, energy-density, energy or power levels may be selected sequentially for display and measurement on a typical display device such as the face of a common moving coil-permanent magnet meter,
   h. an optional system calibration means which embodies an adjustable known voltage source that may be introduced at any appropriate point within the aforesaid system means, while simultaneously monitoring other selected points within the system using the preceeding system monitoring means, so as to calibrate the system to assure proper operation and accuracy of the data, facilitate adjustment of each system function or programing selection, and as a means of fault location diagnosis and maintenance,
   j. appropriate power supply means as are necessary for proper system operation.

2. The combination in accordance with claim 1 wherein said system is entirely self-powered by the transducer means and operates as an analogue computational system with exception only to the optional system calibration means voltage source.

3. The combination in accordance with claim 1 wherein said system the sub-monitoring means may be provided by an intensity modulated triggered light display or said monitor meter circuitry or both implemented independently in the same monitoring means.

4. The combination in accordance with claim 1 wherein said system may be a digital implementation comprised of:
   a. a transducer means for detecting the presence of solar radiant energy which is responsive to the radiant intensity to produce a pulse signal whose frequency or repetition rate is some accurate multiple of the radiant intensity of the sun,
   b. a digital threshold means connected to the transducer means which embodies a digital counter and coded AND Gate to detect the radiant intensity level of the sun and which may be coded and enabled to initiate the metering and recording of solar energy levels to only that above a preset lower threshold limit, or optionally not enabled,
   c. a digital computing means comprised of large scale integrated (LSI) micro-processors and read only memories (ROMs) connected to the threshold means and transducer means which means computes energy-density levels in a digital mathematical function, said means may be ROM preprogramed for a variety of additional computational functions and may be inhibited or enabled in response to the aforesaid threshold means coded AND Gate outputs,
   d. a programing means connected to the digital computing means and lower threshold means by which the preprogramed ROM of the computing means may be addressed to command the numerous digital computational functions required for system operation and by which means the threshold limits are selected and enabled,
   e. a metering function selection means connected to the computing means which embodies a LSI micro-processor and digital-to-analogue (D/A) converter and by which means the computed values of solar energy-density, energy or power levels may be converted to digital or analogue voltage units and scales appropriate to the recording means employed,
   f. a recording means connected to the metering function selection means which may be a common digital type printing or magnetic recorder, mercury coulometer or both for recording the sum total of, or the instantaneous energy density or power levels metered, or for integrating these levels continuously over a desired period of time, g. appropriate system monitoring and calibration means composed of digital micro-processors, ROM's, keyboard or switches and a meter movement with D/A converter or LED numerical display or like display means, h. appropriate power supply means as are required for the proper operation of the system.

5. The combination in accordance with claim 1 wherein said system the processing of the transducer means output pulse signal, whose repetition rate or frequency is proportional to some multiple of the radiant intensity of the sun, is manipulated in a digital video threshold and computer means by common adjustable multivibrators, flip-flop and bootstrap circuits in such a way as to produce the desired system computational functions and results in an output signal whose duty cycle is proportional to the energy-density, energy or power levels of the sun, which when integrated and filtered may be scaled and recorded as described using the mercury coulometer or other recorder.

6. The system combination in accordance with claim 1, 2, 3, 4 or 5 in which the transducer means embodies common energy absorber surfaces which are not ideal directional absorbers, and common pyrometer sensor-generators comprised of photovoltaic thermopile or thermovoltic generators or the like typical sensors and which may be masked by interposed mechanical solid covers to restrict the field of view to only the useful solar window and in which the calibration circuit provides sufficient range of adjustment to compensate for degredation of the transducer components over a reasonable lifetime.

7. The system combination in accordance with claim 1, 2, 3, 4, 5 or 6 configured for descrete band spectral radiance measurement and recording by the insertion of narrow bandpass or sharp cutoff optical filters or by the replacement of the clear dome with optical filter glass domes of the desired characteristics.

8. A pyranometer with solar-window coincident directional field of view of extreme reliability and stability consisting of the transducer of this invention which embodies one or more cover domes of high transmittance optical glass transmitting the principal energy spectra of the solar radiance propagated through the atmosphere, in which the sensor absorbing surface is an ideal absorber of nondegrading high thermal inertia character constructed from long tapered needles with bright reflective surfaces bundled into a compact unipointed mass to which is mechanically and thermally affixed at the end opposite the points a thermopile or thermocouple-thermister combination voltage generator which generates a linear voltage proportional to the incident solar radiant energy over a very broad spectra, which sensor-generator combination is compensated for the ambient temperature by an ambient sensor plate to which is similarly affixed a thermo-couple generator which produces a counter voltage to that of the solar radiant energy sensor generator, and which transducer assembly is optimally configured to minimize reradiation, conductive and convective energy losses thus attaining a performance characteristic typical of Solar Energy Collector Systems.

* * * * *